INVENTORS.
Thomas I. Marx
Claude W. Lowe
BY
Scofield, Lokjer, Scofield & Lowe
ATTORNEYS.

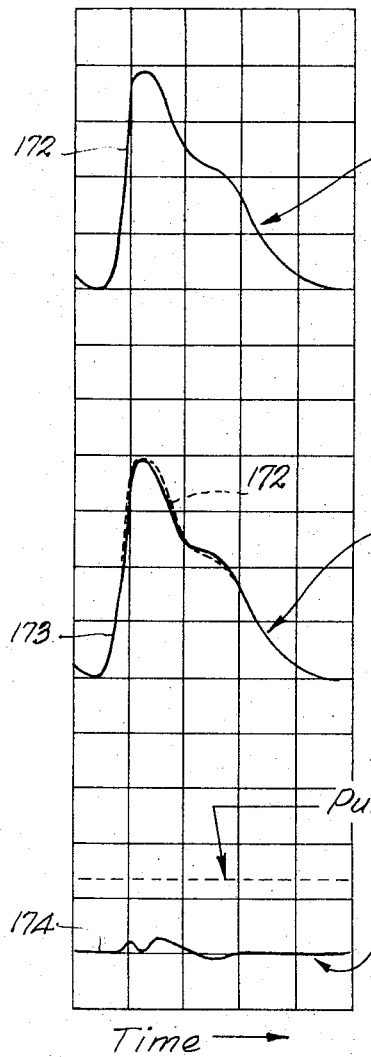
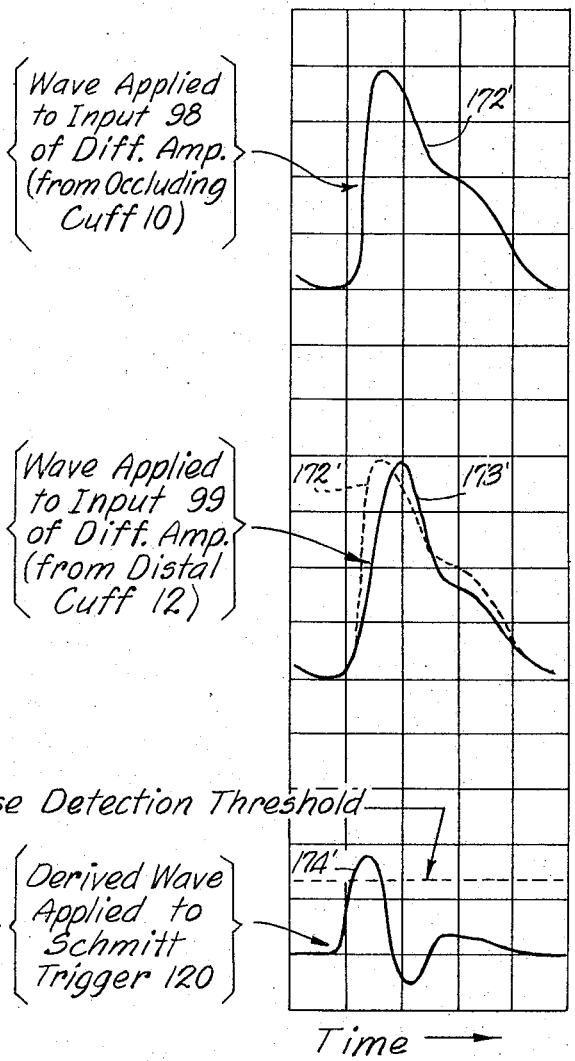

United States Patent Office 3,348,534
Patented Oct. 24, 1967

3,348,534
AUTOMATIC SPHYGMOMANOMETER
Thomas I. Marx, Hingham, Mass., and Claude W. Lowe, Kansas City, Mo., assignors to W. W. Holland, Macomb, Ill., and W. L. Davis, Keokuk, Iowa
Filed Nov. 6, 1963, Ser. No. 321,893
33 Claims. (Cl. 128—2.05)

The present invention relates in general to the measurement of blood pressure, and deals more particularly with an improved apparatus for measuring the diastolic and systolic blood pressures in human beings.

Basically, the measurement of blood pressure in humans is concerned with determining the maximum and minimum excursions of arterial pressure occurring due the cyclic pumping action of the heart. The highest pressure occurs during contraction of the heart muscle (systole) and is called systolic pressure, while the lowest occurs during the relaxation of the heart muscle between beats (diastole) and is called diastolic pressure.

The accepted method of determining the systolic and diastolic end points in the case of any given individual involves the use of a sphygmomanometer. This is a clinical instrument comprising an inflatable cuff which is wrapped about the upper arm of the subject, the cuff having an associated hand bulb for inflating the cuff, and also having a mercury manometer or other form of gauge for indicating the pressure in the cuff. Before making the measurement, the cuff ordinarily is inflated until the flow of blood through the brachial artery is completely occluded. Then, as it is allowed to deflate gradually, the operator applies a stethoscope over the artery below the cuff and listens for the faint pulse sounds that identify first the systolic end point and later the diastolic end point, at the same time noting from the manometer the pressure at which these sounds are heard.

Although the auscultatory method of determining systolic and diastolic blood pressure is universally used, its many shortcomings have long been recognized. To begin with, because of the degree of skill and experience required in observing and interpreting the sounds picked up by stethoscope, the task of measuring blood pressure cannot ordinarily be delegated to unskilled or untrained personnel without substantial risk of error. Indeed, even with qualified observers the reliability and accuracy of measurements may be surprisingly variable. Much depends on the hearing perception or acuity of the individual observer, particularly in certain portions of the audio spectrum; also, the intensity and quality of the sounds reaching his ears may be influenced by such factors as the obesity of the subject, the acoustical characteristics of the particular stethoscope employed, the pressure of the stethoscope bell on the subject, etc. It is recognized that even under standard conditions an error as high as 8 mm. of mercury may be expected in one or both end point measurements.

It is an object of the present invention, among other things, to overcome these shortcomings. More particularly, an aim of the invention is to provide an improved apparatus which can be employed by anyone, however untrained, inexperienced and unskilled, in measuring diastolic and systolic blood pressure. Another object is to improve the accuracy and repeatability of blood pressure measurements by eliminating the necessity for relying on the individual skill, acuity and other qualifications of the observer in determining the diastolic and systolic end points. It is an object, in other words, to eliminate potential sources of human error, mistake and inaccuracy.

In addition to providing a sphygmomanometer capable of measuring systolic and diastolic pressure with good accuracy and repeatability—and doing so quickly and easily even in the hands of an inexperienced or unskilled operator—it is a further object of the invention to provide a unit of this kind which can, with accuracy and ease, measure very low values of diastolic pressure and/or very high values of systolic pressure so that the useful range is substantially larger than heretofore feasible.

An important object of the invention is to provide an improved fully automatic sphygmomanometer which is capable of sensing and interpreting the arterial pulse manifestation and indicating or otherwise registering the systolic and diastolic values directly.

Attempts have been made for many years to perfect a practical, reliable and accurate instrument for measuring blood pressure automatically. Many of the proposed arrangements are based on the auscultatory method, employing a microphone or kindred pickup for sensing the arterial pulse wave. These arrangements generally suffer from various shortcomings. For example, microphone placement or location is quite critical. Again, sensitivity to background noise, patient movement etc., often gives rise to difficulties and spurious operation. And almost invariably the electronic circuitry requires some kind of readjustment according to individual characteristics of each subjected tested.

It is an object of the present invention to overcome all of the foregoing drawbacks and shortcomings. Specifically, one object is to provide an automatic sphygmomanometer which requires no readjustment to accommodate the equipment to different subjects even though they may differ widely from one another in their systolic and diastolic end points. In our sphygmomanometer the arterial pulse information utilized for blood pressure measurements is derived through the use of two inflatable cuffs. The attachment of these to the arm of the subject is free from the criticality which characterizes the placement of microphones employed in auscultatory systems, and the cuffs are entirely insensitive to audio noise.

An important feature of the invention resides in determining the diastolic pressure of the subject by a comparison of the oscillometric pulsations of the respective cuffs, as the cuff inflation is varied through a range including the subject's diastolic pressure. In this connection it has been discovered that at diastolic pressure the relative phase relationship of the oscillometric waves generated by the two cuffs undergoes a change which reliably identifies the diastolic end point and thus can be used in determining diastolic pressure. A salient feature resides in the provision of novel circuit means for comparing the respective waves and registering diastolic pressure.

It is another object of the invention to provide an improved transducer for use with the sphygmomanometer cuffs.

A further object is to provide an automatic sphygmomanometer as outlined above, which is not subject to false operation by signals of spurious origin.

Still another object is to provide a fully automatic sphygmomanometer which is so simple to operate and so reliable and trouble free that it is well-suited for coin-controlled installations.

Yet another object is to provide a sphygmomanometer whose operation, when once initiated, will continue automatically through all of the steps required to complete a blood pressure measurement, or, if desired, will recycle automatically for the purpose of making repeated measurements of blood pressure.

Other objects of the invention, together with features of novelty whereby the objects are achieved, will appear in the course of the following description.

In the drawings which form a part of the specification and are to be read in conjunction therewith, and in which like reference numerals refer to like parts in the various views.

Figure 3A:
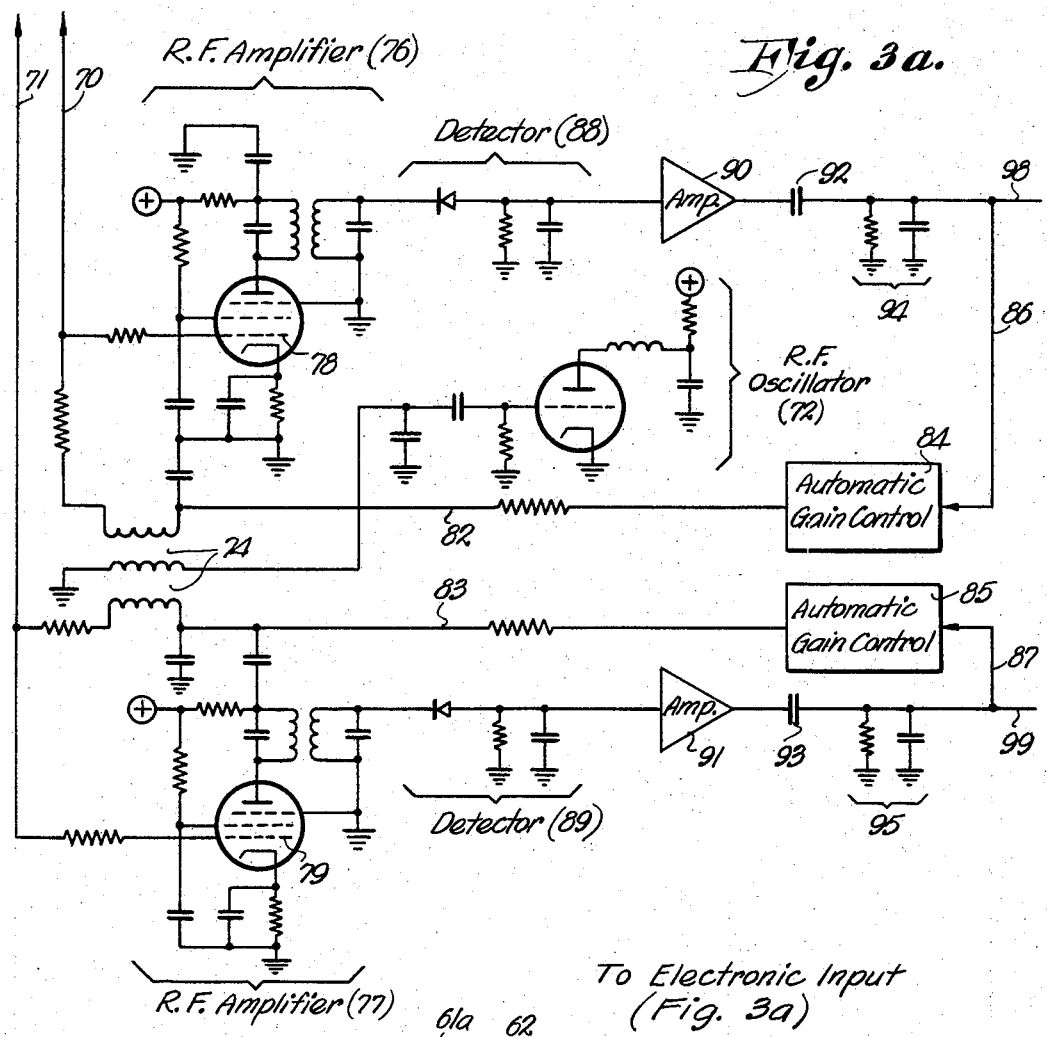
Figure 5:
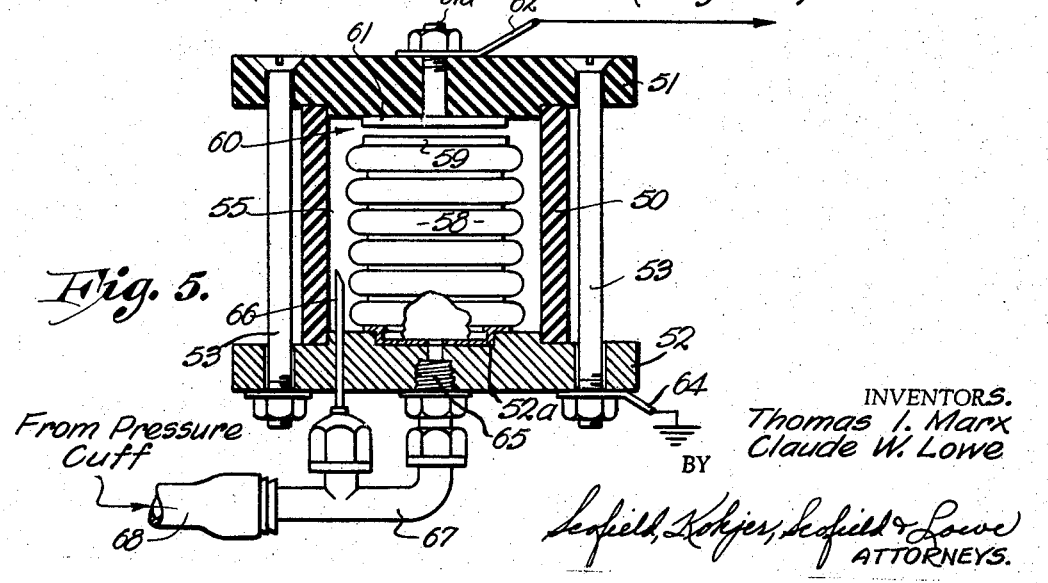
Figure 3B:
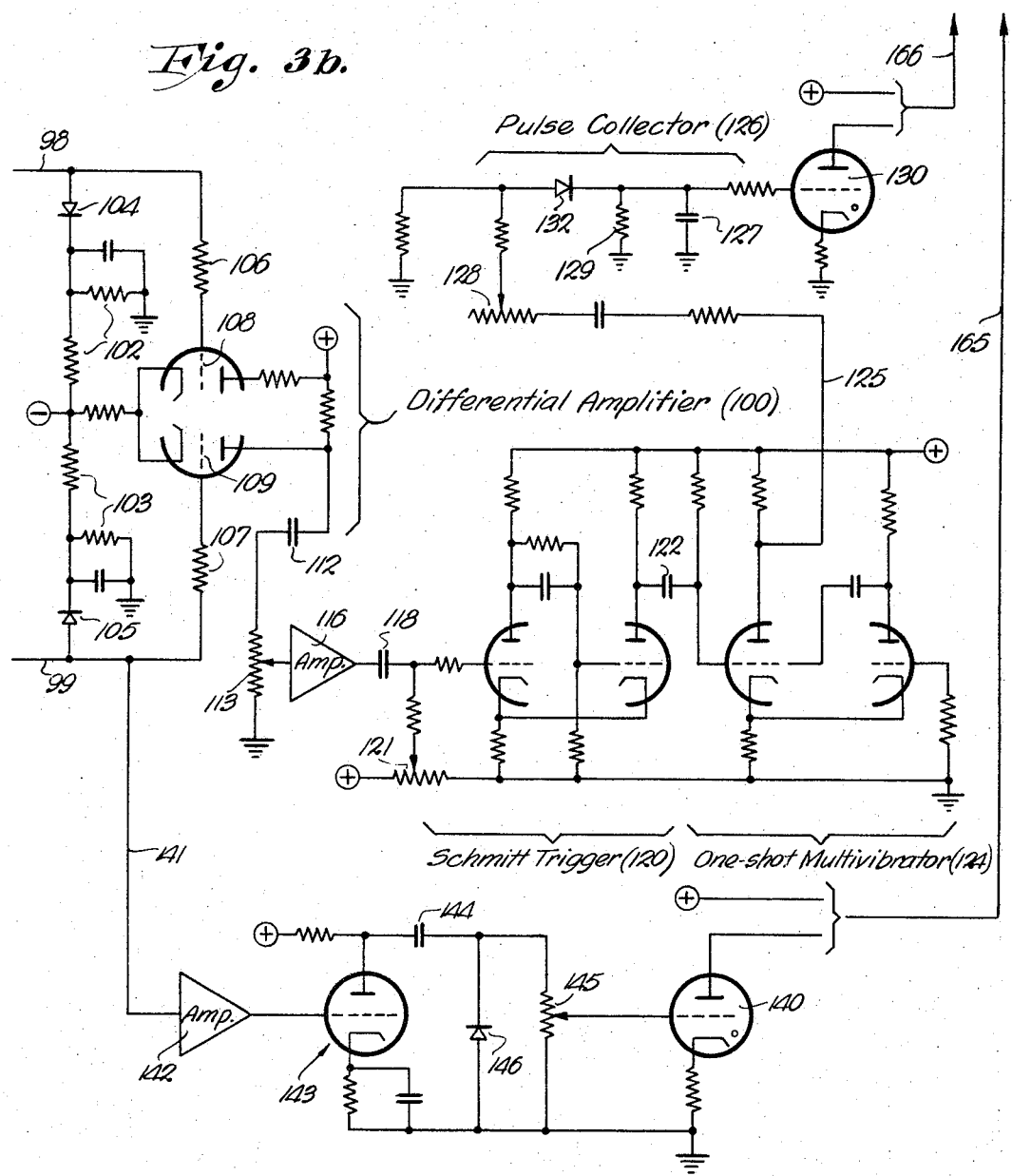
Figure 4:
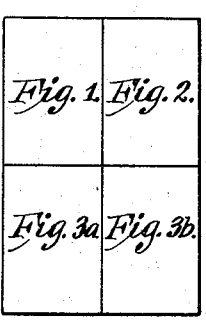

FIGURES 3a and 3b comprise a schematic circuit diagram showing the electronic system employed in our sphygmomanometer;

FIGURE 4 illustrates how FIGURES 1, 2, 3a and 3b should be arranged in order to fully understand the invention;

FIGURE 5 is a cross-sectional view of a preferred form of pulse wave transducer suitable for use with the pressure cuffs in our automatic sphygmomanometer.

FIGURE 6a is an idealized showing of the derived arterial pulse waveforms that appear simultaneously at different points in the electronic system in the course of a typical single cardiac cycle, when the pressure cuffs applied to the subject are inflated to a pressure which is less than the diastolic pressure of the subject; and FIGURE 6b is a similar showing of the pulse waveforms that appear at the same points in the electronic system in the course of a typical single cardiac cycle, when the pressure in the inflated cuffs is increased to a level which is equal to or greater than the diastolic pressure of the subject.

*The fluid pressure system*

Figure 1:
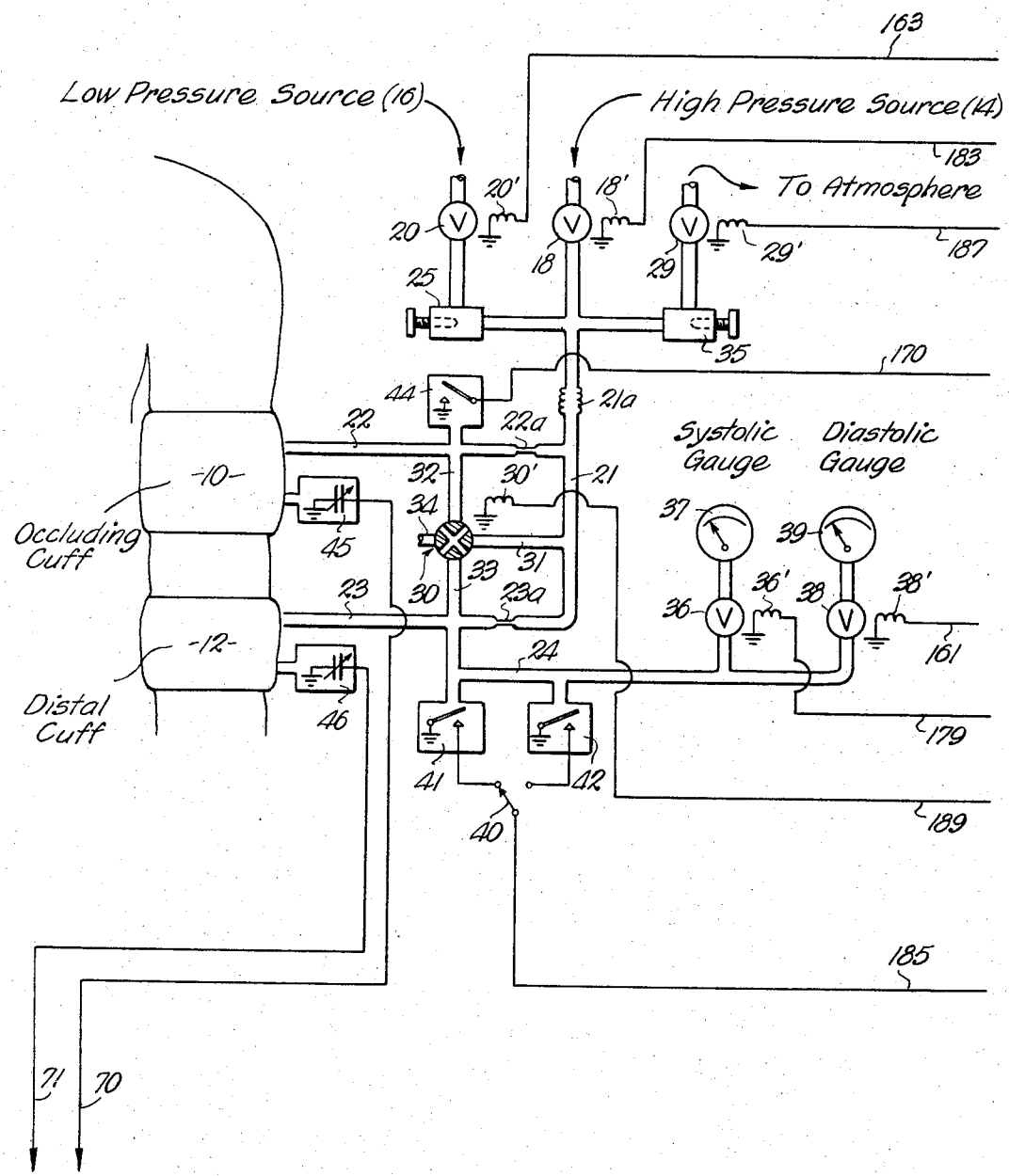
FIGURE 1 is a schematic diagram of the fluid pressure system employed in our improved automatic sphygmomanometer, the electrical control connections associated with certain of the components also being indicated.

Referring first to FIGURE 1, our invention employs a sphygmomanometer cuff 10 adapted to be wrapped or otherwise fastened about a limb of the subject (for example his upper arm) in such fashion that by inflating the cuff the brachial artery can be compressed to occlude the flow of blood therethrough. In order to sense the pulse waveform below the occluding cuff 10 we prefer to utilize a second, or distal, pneumatic cuff 12.

The cuffs are arranged for relatively rapid inflation during one portion of a given cycle of operation of the apparatus, and for relatively slow inflation during another portion, as will be described more fully hereinafter. For rapid inflation we employ a source of compressed air 14 which is maintained at a pressure well above the highest systolic blood pressure readings encountered in practice; it has been found desirable that this source have a pressure in the order of 350 mm. of mercury. For slow inflation it is convenient to employ a second source of compressed air 16 which is maintained at a pressure somewhat above the highest diastolic blood pressure readings encountered in practice; this source, for example, can have a pressure in the order of 140 mm. of mercury.

Associated with the high pressure and low pressure supply lines respectively, are normally closed shut-off valves 18 and 20, either one of which can be opened by an associated solenoid 18' or 20'. (As is true of all other solenoid-controlled valves shown in FIGURE 1, valves 18 and 20 may be assumed to be spring biased to closed position, whereby either valve will open only upon energization of the associated solenoid and, upon subsequent deenergization of the solenoid, will immediately return to closed position.)

It will be evident from FIGURE 1 that when valve 18 is opened for rapid inflation of cuffs 10 and 12, air from the high pressure source 14 flows through the valve into line 21 and thence via branch lines 22 and 23 into the respective cuffs. On the other hand, when valve 20 is opened for slow inflation of the cuffs, air from the low pressure source 16 flows through the throttling valve 25 into line 21 and thence to the cuffs via branch lines 22 and 23. Throttling valve 25 conveniently can be a needle valve which is manually adjustable for the purpose of adjusting the exact cuff inflation rate, as desired.

When the pressure supply source is shut off by closing of the associated valve (18 or 20) following inflation of the cuffs, the cuffs will remain inflated until such time as the slow-deflate valve 29 or the rapid-deflate valve 30 is opened. Both are solenoid controlled. Opening of valve 30 connects lines 31, 32 and 33 directly to the discharge vent or outlet 34, so that the entire pneumatic system (including lines 21, 22, 23 and 24, as well as cuffs 10 and 12) is quickly exhausted to atmosphere. Alternatively, if the slow-deflate valve 29 is opened air will flow from the cuffs through branch lines 22 and 23 into line 21, from which the air can escape only slowly to atmosphere through the adjustable throttle valve 35 and the open valve 29, whereby cuff deflation takes place gradually.

Let it be assumed for a moment that cuffs 10 and 12 have been inflated to some arbitrary value below the systolic pressure of the subject, and that valves 18, 20, 29 and 30 are all closed. Disregarding any effect produced by the subject's arterial pulse, it will be obvious that the static or applied pneumatic pressure is alike at the two cuffs inasmuch as lines 21, 22 and 23 form a pressure-balancing passageway between them. Although the applied pressure remains steady, the instantaneous value of the pressure in each cuff will fluctuate slightly due to the arterial pulse of the subject, producing corresponding pressure pulsations in lines 22 and 23. Line 22 contains a section 22a which is constricted to form a passageway of very small bore adjacent to line 21, and line 23 has a similar constricted section 23a. These act as low-pass filters which prevent the pressure pulsations in line 22 from being communicated to line 23 (and vice versa) while always maintaining both lines at the same mean pressure as the static pressure of line 21.

Thus if valve 20 is opened to feed more air slowly into line 21, or if, instead, valve 29 is opened to permit some of the air already in line 21 to bleed off to atmosphere, the mean pressure in lines 22 an 23 will gradually increase or decrease along with that in line 21 so as to remain equal as the cuffs inflate or deflate. Even as this takes place, however, the low pass filters 22a and 23a prevent intercommunication of the high frequency oscillometric pulsations induced in the respective cuffs by the arterial pulse of the subject. Line 21 preferably includes a flexible bellows section 21a for absorbing the effect of pneumatic and mechanical transients occurring as the various solenoid valves suddenly open and close to initiate changes in the pressure of the line 21.

A pair of pressure gauges 37 and 39 are connected to line 24 via the normally closed valves 36 and 38. As will be evident, opening of either valve will cause the gauge associated therewith to register the pressure then existing in the distal cuff 12. Both valves are solenoid controlled and, as will be explained hereinafter, their operation is so timed in relation to the other operations of the apparatus that systolic pressure always is registered on gauge 37 and diastolic is always registered on gauge 39.

Also connected to line 24 are two normally open pressure switches 41 and 42, the function of which will be made clear presently. Switch 41 is adjusted to close when the pressure in the distal cuff 12 exceeds an arbitrary value that is above the systolic readings normally encountered in practice, say, 230 mm. of mercury. To deal with those exceptional cases in which systolic pressure exceeds the setting of switch 41, switch 42 is set to close at a higher value, say, 300 mm. of mercury. A manually reversible selector switch 40 determines which of the two pressure switches (41 or 42) will be effective in any given instance.

A similar normally open pressure switch 44 is connected to line 22. Its purpose likewise will be explained hereinafter and it will suffice merely to mention at this point that switch 44 is set to close when the pressure in the occluding cuff 10 exceeds a rather low figure, which conveniently can be in the order of 15–18 mm. of mercury. However, a higher setting of switch 44 can be employed with perfectly satisfactory results, provided that the switch closes at a value well below the diastolic pressure of the subject being tested. It should be understood that, as is the case with switch 44, the setting of switches 41 and 42 is adjustable, but when once set it is not contemplated that their setting will be altered or disturbed in the normal usage of our automatic sphygmomanometer.

Connected to the occluding cuff 10 and to the distal cuff 12, respectively, are pulse wave transducers 45 and 46. These preferably take the form shown in FIGURE 5. Each has a housing made of a short section of cylindrical tube 50, the ends of which are closed by a top plate 51 and a bottom plate 52. These parts are firmly secured together by clamping bolts 53 or otherwise, to form an enclosed chamber 55. The bottom plate 52 is metal but the cylindrical side wall 50 and the top plate 51 are made of electrical insulating material.

Within the housing is a metal bellows 58. This has one end received in a shallow central well 52a in the bottom plate, the two being brazed or soldered together around the lower periphery of the bellows. The upper end of the bellows is closed by a circular disc 59 similarly soldered thereto.

Disc 59 functions as the movable plate of a capacitor 60 which has an opposed stationary plate 61. The stationary plate comprises a circular disc having an integral threaded stem 61a by means of which it is secured to the top member 51 of the housing, as shown. The respective plates of the capacitor have external electrical terminals 62 and 64 by which the transducer can be coupled with the input of the electronic system in the manner illustrated schematically in FIGURES 1 and 3a.

A hollow nipple 65 screw-threadedly received in the bottom of the housing communicates with the interior of the bellows. A slender hollow needle 66 extending through the bottom plate as illustrated communicates with the portion of chamber 55 surrounding the bellows. Except for the air passageways afforded by the hollow nipple and the hollow needle, the interior of bellows 58 is hermetically sealed and the portion of chamber 55 surrounding the bellows likewise is hermetically sealed. The fitting 67 connected to both passageways is adapted to receive a hose 68 by which the transducer is connected to its associated pressure cuff 10 or 12 (see FIGURE 1).

During inflation or deflation of the associated cuff as described hereinbefore, the increasing or decreasing pressure is, of course, imposed on the transducer via its connecting hose line 68. However, the hose communicates with the space inside bellows 58 (via nipple 65) and also with the space 55 outside of the bellows (via hollow needle 66) so the pressure balance or equilibrium between these two regions is not disturbed by cuff inflation or deflation. There being no pressure differential between the interior and the exterior of bellows 58 it is no-wise affected by changes of this kind, and accordingly the capacitance of condenser 60 is not influenced by the degree of cuff inflation nor by changes therein.

Instead, this transducer is sensitive only to oscillometric pressure pulsations of higher frequency, such as those induced in the associated cuff, 10 or 12, by the arterial pulse of the subject. The slender hollow needle 66 acts as a low pass air filter which keeps these high frequency pulsations from entering the space 55 surrounding the bellows. The pulsations therefore are admitted only to the interior of the bellows, producing movement which varies the spacing of capacitor plates 59 and 61 in such fashion that the capacitative reactance of the transducer varies with the changing value of instantaneous pressure and follows the waveform of the pressure pulsations.

Referring again to FIGURE 1, and assuming that the cuffs 10 and 12 are inflated to less than the diastolic pressure of the subject, it is desirable for the purpose of the present invention that the pressure pulsations received by transducer 45 and those received by transducer 46 be nearly alike in amplitude in order to facilitate comparison of the respective waveforms. With this in mind, it is preferred in practice to employ a distal cuff 12 which is somewhat smaller in size than the occluding cuff 10, as indicated schematically in the drawing. By doing this, the amplitude of capacitance variation of the two transducers can be made nearly equal at inflation pressures below diastolic. The respective transducers are coupled by conductors 70 and 71 to the inputs of two separate signal channels in the electronic section of the automatic sphygmomanometer, and it will be convenient to describe the later briefly at this point.

*The electronic system*

Referring to FIGURES 3a and 3b, a conventional radio frequency oscillator 72 is provided, which is common to both of the aforementioned channels. This is inductively coupled by transformer 74 to the inputs of identical radio frequency amplifiers 76 and 77. Transducer 45 is connected via conductor 70 to the same input of one of the RF amplifiers (76), while transducer 46 is connected in like fashion via conductor 71 to the input of the other amplifier (77). The RF voltage developed across each capacitative transducer varies, of course, with variations in the pressure imposed on the transducer by its associated cuff, and in practice an essentially linear relation between the two is obtained. Amplifier 76 thus receives at its input grid 78 a radio frequency carrier modulated by transducer 45 in accordance with the oscillometric pressure pulsations in the occluding cuff 10. Similarly, amplifier 77 receives at its input grid 79 a radio frequency carrier modulated by transducer 46 in accordance with the pressure pulsations in the distal cuff 12.

The gain of amplifier 76 is regulated by a negative D.C. bias supplied to its grid circuit via conductor 82 from the automatic gain control circuit 84. In like fashion the gain of amplifier 77 is regulated by a negative D.C. bias supplied to its grid circuit via conductor 83 from the automatic gain control circuit 85. More will be said about this regulation presently.

Amplifiers 76 and 77 have their outputs coupled, respectively, with conventional diode detectors 88 and 89. Each detector serves to recover the modulating signal for its particular channel and to feed this, free of the radio frequency carrier, to the amplifying stage which follows. Thus, the waveform of the signal received by amplifier 90 essentially duplicates that of the pressure pulsations in occluding cuff 10, while the waveform of the signal reaching amplifier 91 essentially duplicates that of the pressure pulsations in the distal cuff 12. After amplification, the respective signals are fed through coupling capacitors (92, 93) and low pass filters (94, 95) in the respective channels to the input leads 98, 99 of a differential amplifier 100.

Also connected to the last-mentioned leads by means of conductors 86 and 87, respectively, are the inputs of the automatic gain control circuits 84 and 85, mentioned earlier. Circuit 84 senses the signal level or amplitude at the input lead 98 and in the event of any change therein it automatically adjusts the negative D.C. bias on the input amplifier 76 upwardly or downwardly so that by regulating the gain of the amplifier it tends to counteract the change. Circuit 85 functions similarly with respect to the signal level in the other channel. Automatic gain control circuits suitable for this purpose are shown and explained, for example, in Sturley, Radio Receiver Design, 1954 edition, chapter 12.

A negative voltage divider 102 is connected via clamping diode 104 and resistor 106 to one input grid 108 of the differential amplifier thereby to bias the grid. The other input grid 109 is also biased negatively by an identical arrangement, comprising voltage divider 103, clamping diode 105 and resistor 107. If the signals received at the respective grids are identical in amplitude, waveform and timing, no signal will be produced in the output of the differential amplifier. As a practical matter, however, there almost always is at least a small difference between the signals produced by the occluding cuff and the distal cuff, and the difference between them may be substantial at times, as will be explained more fully hereinafter. Accordingly an amplified difference signal corresponding to the difference between the signals applied to grids 108 and 109 will be fed by the differential amplifier 100 through the coupling capacitor 112 and voltage divider 113 to the amplifier 116.

The output of amplifier 116 is impressed via capacitor 118 on the input of a Schmitt trigger 120. For each cycle of the incoming wave, this produces a pulse of essentially constant value (a flat-topped pulse) for the period of time that the input waveform exceeds a value determined by the setting of the grid bias resistor 121.

From the output of the Schmitt trigger these pulses are fed through capacitor 122 to a cathode coupled one-shot multivibrator 124. Here they are converted into pulses of predetermined essentially square shape and fed through the output conductor 125 to a collector circuit 126 of the pulse-counting type. In effect, it is the purpose of the collector circuit to tentatively sample incoming pulses and to reject, as being of spurious origin, pulses that do not occur with normal heartbeat periodicity. In humans the normal minimum pulse rate is approximately 50 beats per minute, which is to say that the maximum period of successive beats is about 1.2 seconds. The pulse collector circuit 126 must receive at least two (and preferably a series of three) pulses within a space of time satisfying this condition before it will cause thyratron 130 to fire. All other pulses are rejected and have no effect.

Considering the operation of the pulse collector more closely, each pulse received from the one-shot multivibrator charges capacitor 127 a certain amount, this amount being adjustable by means of the variable resistor 128. Except for the presence of resistor 129, capacitor 127 would hold its charge between successive pulses inasmuch as diode 132 blocks reverse flow of discharge current to the remainder of the circuit. However, in the interval between successive pulses resistor 129 permits at least part of the charge on capacitor 127 to leak off to ground. Assuming that the interval is not so long as to permit the capacitor to discharge completely over this path, succeeding pulses will cause the charge on the capacitor to build up to the level required to fire thyratron 130.

Preferably the collector circuit is so adjusted as to bring the grid of thyratron 130 to firing level only in the event that two successive pulses are received within the space of 1.25 seconds or, better still, only in the event that three successive pulses are received within a space of 2.5 seconds, capacitor 127 being arranged to discharge substantially completely via resistor 129 if the interval between the onset of successive pulses exceeds, say, 1.5 seconds. Firing of thyratron 130 is employed in registering the diastolic blood pressure of the subject, as will be explained presently.

Registration of the systolic end point is controlled by a second thyratron 140. The signal governing this thyratron is derived via conductors 99 and 141 from the filtered output of amplifier 91. It will be remembered that the signal in this channel comprises the pulsating wave produced by the transducer (46) which is associated with the distal cuff 12. Received over conductor 141, the distal cuff wave is amplified in a first stage 142, further amplified in a second stage 143 and then fed to the input of the thyratron via the coupling capacitor 144 and an input level adjusting resistor 145, the latter being bridged by the clamping diode 146. The thyratron will fire when the input voltage wave first has a positive peak exceeding a predetermined value, which value is of course determined by the setting of resistor 145.

Operation

Figure 2:
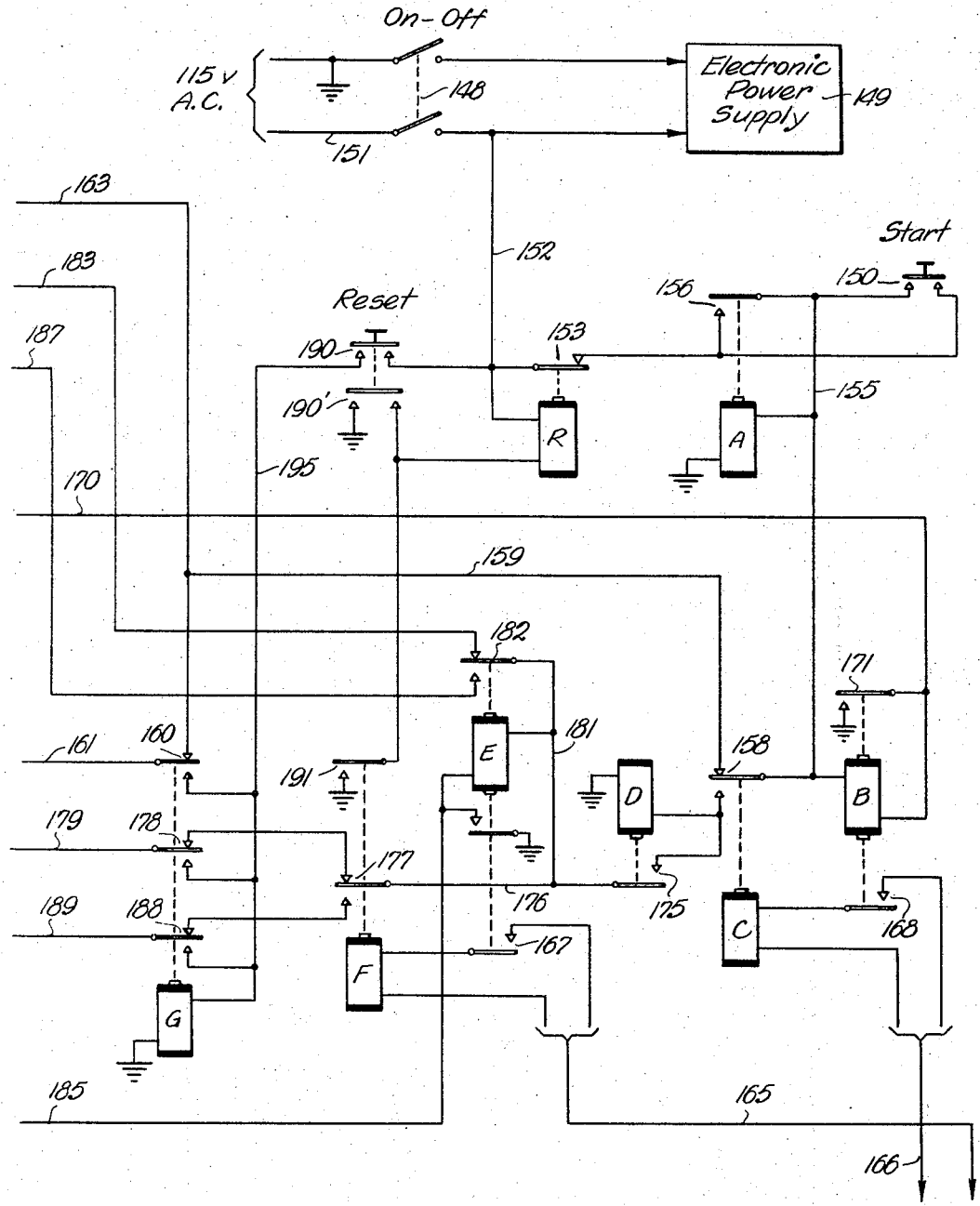
FIGURE 2 is a schematic circuit diagram of a preferred form of relay control system according to the invention.

The automatic sphygmomanometer disclosed herein is conditioned for operation by closing the on-off switch 148 (FIGURE 2). This connects 115 v. alternating current to the power supply 149 for the electronic equipment shown in FIGURES 3a and 3b, but has no other immediate effect. The apparatus is now in stand-by condition, ready for use. In this condition all solenoid-controlled valves of the pneumatic system (FIGURE 1) are closed and all relays are de-energized as shown in FIGURE 2.

Cuffs 10 and 12 having been applied to the arm of a subject in the manner indicated in FIGURE 1, measurement of his blood pressure is initiated by momentarily closing the start switch 150. This can be done manually, or by means of any suitable form of coin collecting mechanism in the event that the apparatus is embodied in a coin-operated installation. Closing of the "start" switch completes a circuit which extends from the ungrounded power line conductor 151 through the lower blade of switch 148, conductor 152, relay contact 153, switch 150, conductor 155 and the winding of relay A to ground, energizing the relay. Relay A thereupon closes its contact 156 which bridges switch 150, and the relay therefore will remain operated when start switch 150 is allowed to open. Potential from the power line conductor 151 now is connected to conductor 155, and since this will continue to be the case throughout the entire balance of the operating cycle it will facilitate the ensuing description to refer to conductor 155 as the "positive" supply line in tracing circuits.

Thus, a circuit now exists which extends from the positive line 155 through relay contact 158, conductor 159, relay contact 160, conductor 161, and solenoid 38' to ground, whereby valve 38 opens and connects the diastolic pressure gauge 39 to line 24. Another circuit extends from the positive line 155 through relay contact 158, conductor 159, conductor 163 and solenoid 20' to ground, whereby valve 20 opens, admitting air from the low pressure source 16 into line 21 at a comparatively slow rate and thus beginning the gradual inflation of cuffs 10 and 12 as described hereinbefore.

As inflation progresses, the gradually increasing pressure in the distal cuff 12 is registered continuously on gauge 39, this being the same, of course, as the pressure on the occluding cuff 10. Also, as the arterial pulsation of the subject begins to make itself felt on the two cuffs, transducers 45 and 46 begin to "follow" the pressure pulsations in the respective cuffs. Accordingly, an electrical signal reflecting the waveform of the pulsations in the occluding cuff begins to appear at conductor 98 (FIGURE 3a) while another signal reflecting the waveform of the pulsations in the distal cuff begins to appear at conductor 99.

The two signals always are too nearly identical at this stage to produce any effective output in the difference amplifier 100. Moreover their amplitude is far below that which would be required to fire thyratron 140.

However, at the earliest stages of inflation some slippage or other movement of the cuffs normally occurs as they adjust themselves to the contour of the subject's arm, and this can produce transient pressure variations which, although spurious, are inevitably picked up by transducers 45 and 46. In the electronic system, high frequency transients of spurious origin are removed by the low pass filters 94 and 95. But even if an unblocked transient of lower frequency should reach conductor 99 and bring the grid of thyratron 140 above its threshold conductance level, the thyratron cannot fire because its plate circuit is open at relay contact 167 (FIGURE 2). Similarly, the plate circuit of thyratron 130 is maintained open at contact 168 in order to eliminate the possibility of premature misfiring.

According to the invention the last mentioned plate circuit is the first to be closed, this being effected automatically under control of the pressure switch 44 (FIGURE 1) when, in the course of inflating the cuffs, the applied pressure reaches a predetermined level. Experience shows that the cuff slippage and adjustment which gives rise to the aforementioned transients comes to an end in virtually all cases by the time that the cuffs have reached a pressure of 3 or 4 mm. of mercury. Switch 44 can safely be set to close at, say, 6 mm. of mercury without risk of malfunction due to spurious transients. Such a setting is desirable in some situations, for example where the apparatus is employed in the operating room during surgery and the need may arise to observe exceptionally low values of diastolic pressure. For most general usage, however, it is preferred to set switch 44 to close at a somewhat higher pressure, say, at 15–18 mm. of mercury, which is still well below the minimum diastolic blood pressure normally encountered in humans.

Closing of pressure switch 44 completes a circuit extending from ground through the closed pressure switch, conductor 170 and the winding of relay B to the positive line 155, thus energizing the relay. Upon operation, relay B completes an obvious locking circuit for itself at contact 171, and by closing contact 168 it connects the winding of relay C into the plate circuit of thyratron 130.

The gradual inflation of cuffs 10 and 12 from the low pressure source 16 continues without interruption, but no further physical change of the apparatus occurs until cuff pressure has increased sufficiently to match the diastolic pressure of the subject. Until that time the arterial pulsations in his arm continue to act on both cuffs simultaneously and in essentially identical fashion, in terms of producing essentially identical waves at the inputs 98 and 99 of the differential amplifier 100. Below diastolic pressure, then, the respective input waves 172 and 173 have only minor differences as shown in FIGURE 6a, and they serve to produce in the output of amplifier 100 a difference wave 174 of but small amplitude, quite insufficient to raise the input of the Schmitt trigger 120 to its threshold operating value.

In this connection, the automatic gain control circuits 84 and 95 are important for several reasons. First, the range or swing or arterial pulse pressure between diastolic and systolic values naturally differs in amplitude in different individuals, and if no compensation were made the amplitude of the waves reaching input 98 and 99 would not be consistent from subject to subject. Second, while by making cuff 12 smaller than cuff 10, the pulsation amplitude of transducers 45 and 46 can be made the same for a particular case, it will not necessarily be the same for all cases tested in view of the differences in arterial pulse amplitude existing from subject to subject; the compensation effected by employing cuffs of different size, in other words, is only an approximate or average compensation. Third, experience shows that the amplitude of arterial pulse oscillation, as reflected by a pressure cuff such as 10 or 12, does not remain uniform as the pressure in the cuff changes; moreover, the rate and character of the amplitude change for a given change in cuff pressure is not necessarily the same for the two cuffs when a particular individual is being tested, and the pattern or the pulse amplitude change varies from individual to individual for a given range of cuff pressure change.

All of these variables are, for practical purposes, eliminated by the automatic gain control circuits 84 and 85 which serve to insure that the signal level or amplitude of the waves impressed on each input 98 and 99 of the differential amplifier remains essentially constant and that the level of the two inputs remain substantially the same. Thus, no readjustment of the apparatus from person to person is required in order to compensate for individual differences in the subjects tested. Likewise the specific size and placement of cuffs 10 and 12 is not critical.

After pressure switch 44 has closed and caused relay C to be connected into the plate circuit of thyratron 130, it occasionally will happen that, due for example to a twitch or brief muscle tremor of the subject, a vagrant spurious pulse will reach input 98 and/or 99. Assuming this occurs before the cuffs 10 and 12 reach diastolic pressure, the spurious pulse may or may not be of such nature and value that differential amplifier 100 will produce an output signal sufficient to raise the input of Schmitt trigger 120 above its threshold operating level. If it is triggered, a single pulse will be fed to the one-shot multivibrator 124, which in turn will feed a single pulse to the collector circuit 126. Since this is not followed by other pulses within the requisite time, the charge on capacitor 127 produced by the single pulse will leak off harmlessly to ground through resistor 129 without firing thyratron 130. Experience shows that pulses of spurious origin which occur after closing of switch 44 are generally single pulses or pulses spaced too far apart in time to have any effect on thyratron 130.

Returning to our consideration of the pulse waves produced at inputs 98 and 99 under the influence of the subject's arterial pulse, although the amount of difference between these two waves remains minor, a very gradual increase begins to appear as the pressure of cuff 10 begins to approach diastolic pressure. In the vicinity of about 5 mm. of mercury below diastolic pressure, cuff 10 evidently begins to have a small but increasing effect as regards throttling or metering the flow of blood downstream to cuff 12 during the portion of the cardiac cycle in which arterial pressure is at lowest ebb. Thus the output wave of the distal cuff begins to be a very slightly distorted version of the natural arterial wave. It would appear that the transitional throttling action of the occluding cuff 10 causes its own output also to begin to become slightly distorted in the sense of being accentuated upon the onset of an ascending arterial pulse wave, the period during which it slightly impedes impingement of this pulse wave on the distal cuff.

While the trend toward increasing difference between the respective waves thus is discernable in the difference wave produced by differential amplifier 100 as the cuffs approach diastolic pressure, the differences still are small and, as previously noted, do not disturb the quiescent state of Schmitt trigger 120. This situation changes quite abruptly, however, when the cuffs reach and begin to cross over the diastolic pressure level of the subject. The precise nature of the action and interaction of artery and cuffs at that point is complex, so any explanation is apt to be an oversimplification. However, as the arterial pulse wave drops to its lowest values during diastole the artery underlying cuff 10 is completely closed off by the pressure of the cuff; consequently when the arterial wave next begins the pressure build-up which ultimately will take it to systolic pressure, the pressure of the blood acting on occluding cuff 10 now must first overcome the pressure of the cuff and, by forcing its way through the artery against this resistance, reopen the occluded artery before a metered downstream flow of blood and transfer of pressure to the distal cuff 12 can begin to take place.

A marked lag in the onset of the pressure wave at the distal cuff therefore makes its appearance when cuff pressure is equal or greater than diastolic, while, on the other hand, the effect of the onset of the wave on the occluding cuff seems to be even sharper and more pronounced than before, presumably due to the hammer action of the wave on the upstream edge of cuff 10 during the interval that flow of blood is blocked by closure of the artery underlying this cuff.

Thus, with the cuffs at diastolic pressure, a substantial disparity between the waves that the respective cuffs produce at inputs 98 and 99 of the differential amplifier now makes its appearance, as shown in FIGURE 6b. The disparity is concentrated mainly in that portion of the cardiac cycle during which the arterial wave increases from diastolic pressure toward the systolic level. At this time in each cycle, the cumulative disparity of the two input waves (which is chiefly a phase disparity) gives rise to a swing in the output wave 174' of the differential amplifier—a swing which is brief in duration but large in amplitude. Schmitt trigger 120 therefore is raised above its threshold operating value briefly at each swing of the output wave, and this of course occurs once in each cardiac cycle.

Accordingly, as soon as cuffs 10 and 12 reach diastolic pressure, the Schmitt trigger begins feeding pulses to the one-shot multivibrator 124 at intervals coinciding with the subject's pulse rate. For each pulse received from the Schmitt trigger, a corresponding pulse of predetermined uniform rectangular shape is supplied by the one-shot multivibrator to the pulse collector 126. As previously explained, the latter "counts" the pulses received by it, and upon reception of the second or third pulse within the proper interval of time it causes thyratron 130 to fire, energizing the winding of its plate relay C.

Upon operation, relay C shifts contact 158, opening the circuit that previously existed over conductor 159 to solenoids 20' and 38'. This causes valve 20 to close, shutting off the low pressure source 16 while, at the same time, valve 38 closes to keep gauge 39 from registering any further change of pressure in the pneumatic system. Registration of the existing (diastolic) pressure therefore is now "locked in" on gauge 39.

At contact 158, relay C also connects the winding of relay D to positive conductor 155, energizing the latter relay. Relay D operates and, by closing contact 175, completes a circuit which extends from positive line 155 through contacts 158 and 175, conductor 176, contacts 177 and 178, conductor 179, and solenoid 36' to ground. At the same time another circuit is completed extending from positive line 155 through relay contacts 158 and 175, conductor 181, relay contact 182, conductor 183 and solenoid 18' to ground. Therefore valves 18 and 36 open simultaneously. Valve 18 allows air from the high pressure source 14 to flow into line 21 so that cuffs 10 and 12 (which heretofore have been inflating slowly) now begin to inflate rapidly. And with valve 36 open, the value of the ascending pressure in the distal cuff 12 now is registered on gauge 37, this pressure, of course, being the same as that in the occluding cuff 10.

Rapid inflation serves to quickly elevate cuff pressure to somewhat above the systolic pressure of the subject; more specifically it continues until the applied pressure in the pneumatic system reaches the level established by the setting of switch 41 which then closes. As previously indicated, switch 41 conveniently can be set to close at about 230 mm. of mercury and switch 42 at about 300 mm. of mercury. With switch 40 positioned as shown, the closing of pressure switch 41 completes a circuit from ground over switch 40, conductor 185, the winding of relay E, conductor 181, relay contact 175 and contact 158 to the positive line 155. Thus, relay E is energized when cuff pressure reaches 230 mm. of mercury, the setting of switch 41. If the position of selector switch 40 were reversed, this would occur, instead, at the setting of pressure switch 42, e.g., 300 mm. of mercury.

Upon operation, relay E closes contact 186 to complete an obvious locking circuit for itself so that the relay will remain operated when the subsequent descent of pressure in the pneumatic system allows pressure switch 41 to reopen. By closing contact 167, relay E also completes the plate circuit of thyratron 140 through the winding of relay F. Thus, the thyratron now is conditioned to fire upon receipt of an ample pulse derived, via conductors 99 and 141, from the distal cuff 12.

(But at the moment the transducer associated with the distal cuff is, of course, producing no pulses; with cuff pressure above the systolic level of the subject, occluding cuff 10 completely blocks blood flow downstream to the distal cuff 12 throughout the entire cardiac cycle, and the arterial pressure wave cannot make itself felt at the distal cuff while the occluding cuff remains above systolic pressure.)

When, by closing contact 167, relay E conditions thyratron 140 for subsequent operation, it also shifts contact 182, which interrupts the previously existing circuit for the solenoid of valve 18 and completes the following circuit for energizing the solenoid of valve 29; positive line 155, through relay contacts 158 and 175, conductor 181, relay contact 182, conductor 187, solenoid 29' and ground. Accordingly the high pressure source 14 now is shut off by valve 18 to bring the rapid inflation of cuffs 10 and 12 to an end, while valve 29 is open to permit air in the pneumatic system to bleed slowly off to atmosphere at a rate regulated by the adjustable needle valve 35. This lets the cuffs deflate gradually.

When the descending pressure in cuff 10 reaches the systolic level, it will at last allow blood to jet through the artery underlying the cuff during the systolic phase of the cardiac cycle. With this, the arterial pressure wave once more begins to impinge cyclically on the distal cuff, causing transducer 46 once more to originate pulses that proceed via the lower or distal pulse channel (FIGURE 3a) to conductor 99; from here they are picked up by conductor 141 and after amplification are impressed on the input of thyratron 140.

Thyratron 140 therefore fires when cuff pressure reaches the systolic level, energizing the winding of its plate relay F. Upon operation, relay F shifts contact 177, which interrupts the previously existing circuit for solenoid 36'. Accordingly valve 36 now closes, "locking in" the existing (systolic)) reading on pressure gauge 37. Relay contact 177 at the same time completes a circuit which extends from the positive line 155 over relay contacts 158 and 175, conductors 176, relay contacts 177 and 188, conductor 189 and solenoid 30' to ground. The rapid-deflate valve 30 therefore opens, quickly exhausting the cuffs and the rest of the pneumatic system to atmosphere as described hereinbefore.

The operation of plate relay F also closes contact 191, completing a circuit which extends from ground through contact 191, winding of release relay R, conductor 152, and the lower blade of closed switch 148 to the ungrounded conductor 151 of the power supply line. Relay R preferably is a slow-operate relay which opens contact 153 after a brief delay, the interval being only long enough to allow the pneumatic system to return to atmospheric pressure via the open rapid-deflate valve 30.

Opening of relay contact 153 interrupts the circuit via which positive line 155 theretofore had received power from conductor 151. As a result, the windings of relays A, B, D and E all are deenergized simultaneously, whereupon these relays release and return to normal. The removal of power from line 155 also causes the solenoids 29' and 30' to deenergize, so the deflate valves 29 and 30 of the pneumatic system now close.

The release of relay B opens contact 168, interrupting the plate circuit of thyratron 130 so that the latter is restored to nonconductive state, relay C being released at the same time. In like fashion, the release or relay E opens contact 167 which, by interrupting the plate circuit of thyratron 140, restores the latter to nonconductive state and causes relay F to release. The latter relay, upon restoring to normal, opens the circuit of relay R at contact 191 so that after a brief interval relay R also returns to normal.

Except for the fact that registration of the subject's systolic pressure and diastolic pressure is locked in on gauges 37 and 39, respectively, the entire apparatus now is restored to original stand-by condition. All relays are released, all valves are closed. The air is exhausted from the pneumatic system. Thyratrons 130 and 140 are nonconducting.

*Clearing and reset operation*

A reset switch having normally open contacts 190 and 190' is provided in order to clear the readings on gauges 37 and 39, and also to bring the remainder of the apparatus immediately to stand-by condition in the event that the switch is operated while the apparatus is in mid-cycle, that is to say while some or all of relays A, B, C, D, E and F are operated and the pneumatic system is in some intermediate stage of cuff inflation or deflation. The reset switch makes it possible, in other words, to interrupt the operation of the apparatus at any point in the cycle, if such should be desired, and by immediately restoring the apparatus to stand-by condition at that point, to effectively eliminate the balance of the cycle. Thus, for instance, after obtaining the diastolic reading on a given subject, the reset switch can be operated momentarily, followed by operation of the start switch 150 to initiate a fresh cycle with a view to obtaining another diastolic reading in a minimum length of time.

The reset switch conveniently can be a push button switch of the self-restoring type. When pressed, contact 190' completes an obvious circuit for energizing the winding of relay R, while contact 190 connects power from the ungrounded power line conductor 151 to conductor 195, energizing relay G. Relays R and G therefore are operated for the interval of time that the reset switch is depressed.

If this occurs in mid-cycle, the operation of relay R, by opening contact 153, disconnects the supply of power from conductor 151 to the positive line 155, which releases all operated relays (except R and G), opens the plate circuits of both thyratrons and recloses any of the valves 18, 20 and 29 that may be open at the time. The aforementioned opening of contact 153 is without effect, of course, in the event that the reset switch is depressed when the apparatus already is in stand-by condition, rather than in mid-cycle.

Whichever is the case, however, relay G, by shifting its contacts 160, 178 and 188, connects solenoids 30', 36' and 38' directly to conductor 195 which now is energized via the closed contact 190 of the reset switch. Accordingly, the valve 30 is opened, as are also valves 36 and 38. Any air contained in gauges 37 and 39 therefore can escape to atmosphere through the open valve 30, clearing the readings on these gauges. If there is any pressure elsewhere in the pneumatic system (as will be the case only if the reset switch is closed in mid-cycle) this likewise can escape through the rapid-deflate valve 30. When reset switch contacts 190 and 190' are allowed to reopen, valves 30, 36 and 38 will immediately close, and relays G and R will restore to normal, leaving the apparatus ready for another cycle of operation.

*Recycling*

Although as has been explained, the registration of the subject's systolic pressure and diastolic pressure on gauges 37 and 39, respectively, can be cleared at the end of a cycle by briefly depressing reset switch 190, 190', it is not essential that this be done before initiating another cycle. If, for instance, after completing a given cycle of operation it should be desired to immediately take another reading on the same subject without first clearing the existing registration from gauges 37 and 39, it is only necessary to close the start switch 150 again for a brief interval. This in itself will automatically clear the reading from diastolic gauge 39 by reopening valve 38 simultaneously with commencement of the new cycle. The cycle then will proceed exactly as has been described, except that the systolic reading obtained on the former cycle will be maintained on gauge 37 until the new diastolic reading has been locked in on gauge 39, at which time gauge 37 will automatically be cleared of the old reading preparatory to receiving the new systolic reading.

Also, the apparatus can be made to recycle over and over again without interruption, thereby to obtain repeated readings of diastolic and systolic pressure on a given subject, as may be desirable in the operating room, for example. For this mode of operation, it is only necessary that start switch 150 be held closed. When this is done, relay R, upon releasing upon the end of each cycle, automatically initiates the next cycle by closing contact 153, and this automatic recycling will continue so long as switch 150 remains closed. Each diastolic reading, when obtained, remains locked in until slow inflation of the cuffs begins again at the start of the next cycle preparatory to obtaining a new diastolic reading. Alternatively, each systolic reading, when obtained, remains locked in until the time in the next cycle when rapid inflation of the cuffs commences preparatory to obtaining a fresh systolic reading. Generally speaking, then, it can be said that the reading on one gauge remains locked in while a fresh reading is being obtained on the other, and vice versa, the changing pressure in the pneumatic system being followed by one gauge during one part of the cycle and by the other gauge during another part.

The time required for each complete cycle of operation naturally will vary depending on the specific pressures of the sources 14 and 16, the speed of cuff inflation and deflation as controlled by adjustable valves 25 and 35, the setting of selector switch 40 and the settings of pressure switches 41 and 42. Very satisfactory results are obtained with a cycle in the order of 1 to 1.5 minutes' duration, although it will be understood that this can be shortened or lengthened at will.

It also should be understood that while exceptionally good results are obtained with capacitance-type transducers such as shown in FIGURE 5, other types of transducers likewise can be employed for converting into electrical waves the oscillometric pressure waves generated by the cuffs.

With the automatic sphygmomanometer of the present invention, accurate readings of systolic and diastolic blood pressure can be obtained with great consistency, as established by extensive tests. It is simple and easy to use, requiring no special skills or training. As has been indicated, placement of the double-cuff pick up is not critical, and no individual adjustment of the apparatus to the particular subject being tested is required. Malfunction due to extraneous sounds and other forms of spurious signals is eliminated. By virtue of the simple and trouble-free character of its use and operation, this sphygmomanometer is well suited for coin-operated installations. At the same time its accuracy, reliability and operational features make the unit ideal for hospital and kindred usage.

From the foregoing it will be seen that the invention is one well adapted to attain all of the ends and objects hereinbefore set forth, together with other advantages which are obvious and which are inherent to the apparatus.

It will be understood that certain features and subcombinations are of utility and may be employed without reference to other features and subcombinations. This is contemplated by and is within the scope of the appended claims.

Inasmuch as various possible embodiments of the invention may be made without departing from the scope thereof, it is to be understood that all matter herein set forth or shown in the accompanying drawings is to be interpreted as illustrative and not in a limiting sense.

Having thus described the invention, we claim:

1. A sphygmomanometer including an occluding cuff and a distal cuff, means for inflating and deflating said cuffs, means for registering the pressure in at least one of said cuffs, means responsive to arterially-induced pressure pulsations in said occluding cuff for generating an electrical wave analogous to said occluding cuff pulsations, means responsive to arterially-induced pressure pulsations in said distal cuff for generating an electrical wave analogous to said distal cuff pulsations, and means for continuously comparing the instantaneous values of the two waves and actuating the said pressure-registering means when the instantaneous values of the respective waves differ by more than by a predetermined amount.

2. A sphygmomanometer as in claim 1, wherein said distal cuff is smaller in size than said occluding cuff.

3. A sphygmomanometer including an occluding cuff and a distal cuff, means for inflating and deflating said cuffs, means responsive to arterially-induced pressure pulsations in said occluding cuff for generating an electrical wave analogous to said occluding cuff pulsations, means responsive to arterially-induced pressure pulsations in said distal cuff for generating an electrical wave analogous to said distal cuff pulsations, said two waves being substantially equal in amplitude, means controlled by said two waves for generating a third wave whose instantaneous value is a function of the instantaneous difference in value of said two waves, means for sensing the amplitude of said third wave, and means controlled by said last means for registering the pressure in one of said cuffs when the amplitude of said third wave exceeds a predetermined value.

4. A sphygmomanometer including an occluding cuff and a distal cuff, means for inflating and deflating said cuffs, means for at times registering the pressure in one of said cuffs, means responsive to arterially-induced pressure pulsations in said occluding cuff for generating an electrical wave analogous to said occluding cuff pulsations, means responsive to arterially-induced pressure pulsations in said distal cuff for generating an electrical wave analogous to said distal cuff pulsations, means controlled by said two waves for generating a third wave whose instantaneous value is a function of the instantaneous difference in value of said two waves, means controlled by said third wave for generating an electrical pulse of predetermined arbitrary character whenever the amplitude of said third wave exceeds a predetermined value, and means responsive to a train of said last pulses for actuating said pressure registering means.

5. A sphygmomanometer as in claim 4, wherein said last means is operative only in response to a pulse train comprising a predetermined number of pulses occurring within a predetermined interval of time.

6. A sphygmomanometer including an occluding cuff and a distal cuff, means for inflating and deflating said cuffs, a pair of electrical signal channels each having an input and an output, means responsive to arterially-induced pressure pulsations in said occluding cuff for impressing on the input of one of said signal channels an electrical signal having a waveform corresponding to said occluding cuff pulsations, means responsive to arterially-induced pressure pulsations in said distal cuff for impressing on the input of the other of said signal channels an electrical signal having a waveform corresponding to said distal cuff pulsations, means maintaining said two signals substantially alike in signal strength at the outputs of the respective channels, said last means comprising an automatic gain control circuit for at least one of said channels, a waveform differentiator coupled to the outputs of the two channels for continuously comparing said signals, means actuated by said differentiator when the instantaneous value of the waveform difference between said signals exceeds a predetermined amount, and means controlled by said last means, upon actuation, for registering the pressure in one of said cuffs.

7. A sphygmomanometer including an occluding cuff and a distal cuff, means for progressively inflating both cuffs, means responsive to arterially-induced pressure pulsations in said occluding cuff for generating a first electrical signal having a waveform corresponding to said occluding cuff pulsations, means responsive to arterially-induced pressure pulsations in said distal cuff for generating a second electrical signal having a waveform corresponding to said distal cuff pulsations, a differential amplifier having two inputs, a first channel via which said first signal is impressed on one of said inputs, a second channel via which said second signal is impressed on the other of said inputs, means maintaining said two signals substantially alike in amplitude at the respective ones of said inputs, said last means comprising an automatic gain control circuit for at least one of said channels, a multivibrator coupled to the output of said differential amplifier and driven by the output signal in the event that the amplitude of said signal exceeds a predetermined level, and means controlled by said multivibrator for registering the pressure in one of said cuffs.

8. In a sphygmomanometer of the type wherein the fluid pressure in an inflatable occluding cuff is progressively varied over a range of pressures including the diastolic pressure of the subject being tested, the improvement which comprises an inflatable distal cuff, a pressure-equalizing passageway between the two cuffs whereby the inflation pressure of the distal cuff varies with that of the occluding cuff, said passageway having frequency-selective filter means substantially preventing the transfer of arterially induced pressure pulsations from either cuff to the other, a transducer responsive to said pressure pulsations in the occluding cuff for generating an electrical signal having a waveform analogous to said occluding cuff pulsations, a transducer responsive to the pressure pulsations in the distal cuff for generating an electrical signal having a waveform analogous to said distal cuff pulsations, a wavefore differentiator for receiving and continuously comparing said signals, means actuated by said differentiator when the instantaneous value of the waveform-difference between said signals exceeds a predetermined amount, and means controlled by said last means, upon actuation, for registering the inflation pressure applied to said cuffs.

9. A sphygmomanometer as in claim 8, wherein said distal cuff is smaller in size than said occluding cuff.

10. A sphygmomanometer as in claim 8, wherein the transducer associated with one of said cuffs comprises an enclosed housing, a flexible member subdividing said housing into two separate compartments, means at all times applying the inflation pressure of said one cuff to both compartments of said housing equally, said last means including a frequency selective wave filter so constructed and arranged that arterially-induced pressure pulsations from said one cuff are only impressed upon a particular one of said two compartments, whereby the pressure differential in the respective compartments moves said flexible member in accordance with said cuff pulsations, and a variable electrical impedance coupled with said one member and actuated thereby.

11. In a sphygmomanometer, an inflatable occluding cuff, cuff-inflating means for progressively increasing the pressure in said occluding cuff, an inflatable distal cuff, a pressure-equalizing passageway between the two cuffs whereby the inflation pressure of the distal cuff increases with that of the occluding cuff, said passageway having frequency-selective filter means substantially preventing the transfer of arterially-induced pressure pulsations from either cuff to the other, a transducer responsive to said pressure pulsations in the occluding cuff for generating a first electrical signal having a waveform analogous to said occluding cuff pulsations, a transducer responsive to the pressure pulsations in the distal cuff for generating a second electrical signal having a waveform analogous to said distal cuff pulsations, a waveform differentiator for receiving and continuously comparing said first and second signals, means for at times registering the pressure in said cuffs, a normally inoperative signal generator, means controlled by said differentiator for initiating the operation of said generator when the instantaneous value of the waveform-difference between said first and second signals exceeds a predetermined level, and means coupled to and controlled by the output of said generator for actuating said pressure-registering means.

12. A sphygmomanometer as in claim 11, having means controlled by the pressure in said cuffs for disabling said last means so long as the cuff pressure is below a predetermined level.

13. In a sphygmomanometer, an inflatable occluding cuff, cuff-inflating means for progressively increasing the pressure in said occluding cuff, an inflatable distal cuff, a pressure-equalizing passageway between the two cuffs whereby the inflation pressure of the distal cuff increases with that of the occluding cuff, said passageway having frequency-selective filter means substantially preventing the transfer of arterially-induced pressure pulsations from either cuff to the other, a transducer responsive to said pressure pulsation in the occluding cuff for generating a first electrical signal having a waveform analogous to said occluding cuff pulsations, a transducer responsive to the pressure pulsations in the distal cuff for generating a second electrical signal having a waveform analogous to said distal cuff pulsations, a waveform differentiator for receiving and continuously comparing said first and second signals, means for at times registering the pressure in said cuffs, means controlled by said differentiator for generating an electrical pulse of predetermined arbitrary character whenever the instantaneous value of the waveform-difference between said first and second signals exceeds a predetermined level, and means responsive to a train of said last pulses for actuating said pressure registering means.

14. A sphygmomanometer as in claim 13, wherein said last means is operative only in response to a pulse train comprising a predetermined number of pulses occurring within a predetermined interval of time.

15. A sphygmomanometer as in claim 13, having means controlled by the pressure in said cuffs to disable said last means so long as the cuff pressure is below a predetermined level.

16. In a sphygmomanometer, an inflatable occluding cuff, cuff-inflating means for progressively increasing the presure in said cuff, an inflatable distal cuff, a pressure-equalizing passageway between said two cuffs whereby the inflation pressure of said distal cuff increases with that of the occluding cuff, said passageway having frequency-selective filter means substantially preventing the transfer of arterially-induced pressure pulsations from either cuff to the other, a tranducer responsive to said pressure pulsations in the occluding cuff for generating a first electrical signal having a waveform analogous to said occluding cuff pulsations, a transducer responsive to said pressure pulsations in the distal cuff for generating a second electrical signal having a waveform analogous to said distal cuff pulsations, means controlled conjointly by said first and second signals for generating a third signal having a waveform corresponding to the waveform-difference between said first and second signals, means controlled by said third signal to operate responsive to a characteristic change in the waveform thereof when the pressure of said cuffs reaches the diastolic pressure of the subject being tested, and means controlled by said last means to register the subject's diastolic pressure.

17. In a sphygmomanometer, an inflatable occluding cuff, cuff-inflating means for progressively increasing the pressure in said cuff, an inflatable distal cuff, a pressure-equalizing passageway between said two cuffs whereby the inflation pressure of said distal cuff increases with that of the occluding cuff, said passageway having frequency-selective filter means substantially preventing the transfer of arterially-induced pressure pulsations from either cuff to the other, a transducer responsive to said pressure pulsations in the occluding cuff for generating a first electrical signal having a waveform analogous to said occluding cuff pulsations, a transducer responsive to said pressure pulsations in the distal cuff for generating a second electrical signal having a waveform analogous to said distal cuff pulsations, means controlled conjointly by the first and second signals for generating a third signal having a waveform corresponding to the waveform-difference between said first and second signals, and means controlled by said third signal in accordance with the waveform thereof for registering the diastolic pressure of the subject being tested.

18. In a sphygmomanometer, an inflatable occluding cuff, cuff-inflating means for progressively increasing the pressure in said cuff, an inflatable distal cuff, a pressure-equalizing passageway between said two cuffs whereby the inflation pressure of said distal cuff increases with that of the occluding cuff, said passageway having frequency-selective filter means substantially preventing the transfer of arterially-induced pressure pulsations from either cuff to the other, a transducer responsive to said pressure pulsations in the occluding cuff for generating a first electrical signal having a waveform analogous to said occluding cuff pulsations, a transducer responsive to said pressure pulsations in the distal cuff for generating a second electrical signal having a waveform analogous to said distal cuff pulsations, means controlled conjointly by said first and second signals for generating a third signal having a waveform corresponding to the waveform-difference between said first and second signals, and means controlled by said third signal in accordance with the waveform thereof for registering the inflation pressure of said cuffs when same substantially matches the diastolic pressure of the subject being tested.

19. In a sphygmomanometer, an inflatable occluding cuff, cuff-inflating means for progressively increasing the pressure in said cuff at a predetermined rate, an inflatable distal cuff, pressure equalizing passageway between said two cuffs whereby the inflation pressure of said distal cuff increases with that of the occluding cuff, said passageway having frequency-selective filter means substantially preventing the transfer of arterially-induced pressure pulsations from either cuff to the other, a transducer responsive to said pressure pulsations in the occluding cuff for generating a first electrical signal having a waveform analogous to said occluding cuff pulsations, a transducer responsive to said pressure pulsations in the distal cuff for generating the second electrical signal having a waveform analogous to said distal cuff pulsations, means controlled conjointly by said first and second signals for generating a third signal having a waveform corresponding to the waveform difference between said first and second signals, means controlled by said signal to operate responsive to a characteristic change in the waveform thereof when the pressure of said cuffs reaches the diastolic pressure of the subject being tested, means controlled by said last means, upon operation, to increase the rate of inflation of said cuffs, and means for halting the inflation of said cuffs when the pressure thereof exceeds the systolic pressure of the subject being tested.

20. In an automatic sphygmomanometer, an occluding cuff, a distal cuff, means for progressively inflating both cuffs at a predetermined rate, a differential amplifier having two inputs and an output, means responsive to arterially-induced pressure pulsations in said occluding cuff for impressing on one input of said amplifier a first signal corresponding in waveform to said occluding cuff pulsations, means responsive to arterially-induced pressure pulsations in said distal cuff for impressing on the other input of said amplifier a second signal corresponding in waveform to said distal cuff pulsations, means coupled to output of said amplifier and operated responsive to a characteristic change in the output signal amplitude when the increasing pressure of said cuffs reaches the level of the diastolic pressure of the subject being tested, means controlled by said last means, upon operation, to increase the rate of inflation of said cuffs, means for halting said inflation of the cuffs when the pressure thereof exceeds the systolic pressure of the subject and then deflating both cuffs progressively at a predetermined rate, other means for receiving said second signal and operated thereby when the diminishing pressure of said cuffs reaches the level of the systolic pressure of the subject, and means controlled by said other means, upon operation, to increase the rate of deflation of said cuffs.

21. In an automatic sphygmomanometer, an occluding cuff, a distal cuff, means for progressively inflating both cuffs at a predetermined rate, a differential amplifier having two inputs and an output, means for impressing on the respective inputs of said amplifier two signals corresponding in waveform to the arterially-induced pressure pulsations in said occluding cuff and in said distal cuff respectively, means coupled to the output of said amplifier and operated responsive to a characteristic change in the output amplitude when the pressure of said cuffs reaches the diastolic pressure of the subject being tested, means controlled by said last means, upon operation, to increase the rate of inflation of said cuffs, and means for thereafter halting inflation of said cuffs when the pressure thereof exceeds the systolic pressure of the subject being tested.

22. In an automatic sphygmomanometer, an occluding cuff, a distal cuff, means for progressively inflating both cuffs at a predetermined rate, a differential amplifier having two inputs and an output, means for impressing on the respective inputs of said amplifier two signals corresponding in waveform to the arterially-induced pressure pulsations in said occluding cuff and in said distal cuff respectively, means coupled to the output of said amplifier and operated responsive to a characteristic change in the output signal amplitude when the pressure of said cuffs reaches the diastolic pressure of the subject being tested, and means controlled by said last means, upon operation, to register the diastolic pressure of the subject.

23. A sphygmomanometer as in claim 22, wherein said distal cuff is smaller in size than said occluding cuff.

24. In an automatic sphygmomanometer, an occluding cuff, a distal cuff, means for progressively inflating both cuffs, means coupled with the cuffs for registering the pressure therein as same increases, a differential amplifier having two inputs and an output, means for impressing on the respective inputs of said amplifier two signals corresponding in wave form to the arterially-induced pressure pulsations in said occluding cuff and in said distal cuff respectively, means coupled to the output of said amplifier and operated responsive to a characteristic change in the output signal amplitude when the pressure of said cuffs reaches the diastolic pressure of the subject being tested, and means controlled by said last means, upon operation, to uncouple said pressure registering means from said cuffs whereby said registering means thereafter maintains a registration of the diastolic pressure of the subject.

25. In a sphygmomanometer, an occluding cuff, a distal cuff, means for progressively inflating both cuffs, means responsive to arterially-induced pressure pulsations in said occluding cuff for generating a first electrical signal corresponding in waveform to said occluding cuff pulsations, means responsive to arterially-induced pressure pulsations in said distal cuff for generating a second electrical signal corresponding in waveform to said distal cuff pulsations, a differential amplifier having two inputs, a first channel via which said first signal is impressed on one of said inputs, a second channel via which said second signal is impressed on the other said inputs, means maintaining the respective ones of said signals substantially alike in amplitude at the respective ones of said inputs, said last means comprising an automatic gain control circuit for at least one of said channels, means coupled to the output of said differential amplifier and operated responsive to a characteristic change in the amplitude of the output signal when the pressure of said cuffs reaches the level of a diastolic pressure of the subject being tested, and means controlled by said last means, upon operation, to register the diastolic pressure of the subject.

26. In a sphygmomanometer, an occluding cuff, a distal cuff, means for progressively inflating both cuffs over a range of pressures including the diastolic and systolic pressures of the subject being tested and then deflating both cuffs progressively over the same range, means responsive to arterially-induced pressure pulsations in said occluding cuff for generating a first electrical signal corresponding in waveform to said occluding cuff pulsations, means responsive to arterially-induced pressure pulsations in said distal cuff for generating a second electrical signal corresponding in waveform to said distal cuff pulsations a differential amplifier having two inputs, a first channel via which said first signal is impressed on one of said inputs, a second channel via which said second signal is impressed on the other of said inputs, means maintaining the respective ones of said signal substantially alike in amplitude at the respective ones of said inputs, said last means comprising an automatic gain control circuit for at least one of said channels, means coupled to the output of said differential amplifier and operated during cuff inflation responsive to a characteristic change in the amplitude in the output signal when the cuff pressure reaches the level of the diastolic pressure of the subject, means controlled by said last means, upon operation, to register the diastolic pressure of a subject, other means for receiving said second signal and operated thereby during cuff deflation when the pressure of the cuffs reaches the pressure of the systolic pressure of the subject, and means controlled by said other means, upon operation, to register the systolic pressure of the subject.

27. In an automatic sphygmomanometer, an occluding cuff, a distal cuff, means for at times inflating both cuffs progressively over a range of pressures including the diastolic and systolic pressures of a subject being tested, means for at other times deflating both cuffs progressively over the same range, first change-over means operated responsive of said cuffs reaching the diastolic pressure of the subject during inflation, second change-over means operated responsive to the cuffs reaching the systolic pressure of the subject during deflation, said inflating means controlled by said first changeover means, upon operation of the latter, to substantially increase the rate of inflation of said cuffs whereby inflation thereof is effected more rapidly in a portion of said range above the subject's diastolic pressure than in the portion below diastolic pressure, and said deflating means controlled by said second change-over means, upon operation of the latter, to substantially increase the rate of deflation of said cuffs whereby deflation thereof is effected more rapidly in the portion of said range below the subject's systolic pressure than in the portion in said range above systolic pressure.

28. A sphygmomanometer as in claim 27, having means controlled by first change-over means to register the diastolic pressure of the subject being tested, and other means controlled by said second changeover means to register the systolic pressure of the subject.

29. In a sphygmomanometer as in claim 27, means coupled with said cuffs and effective during cuff inflation to continuously register the value of the ascending of pressure in that portion of said range which lies below the diastolic pressure of the subject, and means controlled by said first change-over means, upon operation, to uncouple said pressure-registering means from said cuffs whereby the latter means thereafter maintains a registration of the diastolic pressure of the subject.

30. In a sphygmomanometer as in claim 27, means coupled with said cuffs and effective during cuff deflation to continuously register the value of the descending cuff pressure in that portion of the range which lies above the systolic pressure of the subject, and means controlled by said second change-over means, upon operation, to uncouple said pressure registering means from said cuffs whereby the latter means thereafter maintains a registration of the systolic pressure of the subject.

31. In an automatic sphygmomanometer, an occluding cuff, a distal cuff, means for at times inflating both cuffs progressively over a range of pressures including the diastolic and systolic pressures of a subject being tested, means for at other times deflating both cuffs progressively over the same range, recycling apparatus controlling said inflating means and said deflating means to operate the respective ones thereof alternately in a continuously repeating sequence, whereby each inflation of said cuffs is followed by deflation thereof and vice versa, first change-over means operated responsive to the pressure of said cuffs reaching the diastolic pressure of the subject during inflation, second change-over means operated responsive to the cuffs reaching the systolic pressure of the subject during deflation, said inflating means controlled by said first change-over means, upon operation of the latter, to substantially increase the rate of inflation of said cuffs whereby inflation thereof is effected more rapidly in the portion of said range above the subject's diastolic pressure than in the portion below diastolic pressure, and said deflating means controlled by said second changeover means, upon operation of the latter, to substantially increase the rate of deflation of said cuffs whereby deflation thereof is effected more rapidly in the portion of said range below the subject's systolic pressure than in the portion above systolic pressure.

32. In a sphygmomanometer as in claim 31, means controlled jointly by said first change-over means and said recycling apparatus for registering the diastolic pressure of the subject once in each cycle of operation and maintaining the registration for approximately half of the cycle.

33. In a sphygmomanometer as in claim 31, means controlled jointly by said second change-over means and said recycling apparatus for registering the systolic pressure of the subject once in each cycle of operation and maintaining the registration for approximately half of the cycle.

References Cited

UNITED STATES PATENTS

| | | | |
|---|---|---|---|
| 2,149,690 | 3/1939 | Snyder | 128—2.05 |
| 2,375,059 | 5/1945 | Williams et al. | 128—2.05 |
| 2,799,270 | 7/1957 | Rodbard | 128—2.05 |
| 2,827,040 | 3/1958 | Gilford | 128—2.05 |
| 2,875,750 | 3/1959 | Boucke et al. | 128—2.05 |
| 3,052,756 | 9/1962 | Seven et al. | 128—2.05 X |
| 3,157,177 | 11/1964 | Smith | 128—2.05 |

RICHARD A. GAUDET, *Primary Examiner.*

SIMON BRODER, *Examiner.*